Figure 1:
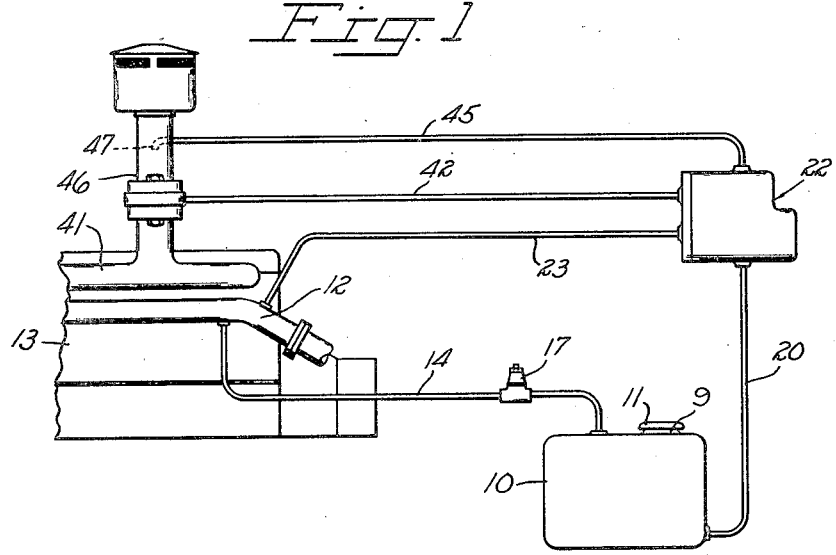

May 16, 1950

C. HODGKINS 2,507,596

FLUID INJECTING DEVICE

Filed May 22, 1947

Inventor

CHESTER HODGKINS

By N. Clay Lindsey
Attorney

Patented May 16, 1950

2,507,596

UNITED STATES PATENT OFFICE 2,507,596

FLUID INJECTING DEVICE

Chester Hodgkins, Hartford, Conn.

Application May 22, 1947, Serial No. 749,726

19 Claims. (Cl. 123—25)

The present invention relates to a fluid injecting device for internal combustion engines, and more particularly to an arrangement for injecting a fluid such as water or alcohol, or water-alcohol mixtures, into the intake of the engine substantially in accordance with the amounts required for optimum performance of the engine.

It is well established that the injection of water or alcohol or water-alcohol mixtures into the fuel intake of internal combustion engines provides many advantages. Principally among such advantages is the possibility of obtaining equal power and smoother operation with fuel of lower octane number than the engine normally requires, or conversely, more power and greater thermal efficiency by increasing the compression ratio while using fuel of the same octane number. While it is not desired to be limited to any particular theory of operation, there apparently is caused a cooling of the pistons, valves, cylinder head, etc. by reason of the fluid injection which suppresses detonation and pre-ignition, thus allowing a higher power output and overcoming engine roughness. While it is not attempted here to list all of the advantages of controlled fluid injection, other beneficial results might be mentioned such as the formation of engine deposits which generally are softer and more easily removed.

It is equally well established that the amount of fluid which is required to be injected into the engine intake in order to obtain the optimum performance characteristics referred to will vary over a wide range depending, for example, upon the speed of the engine and the amount of load under which the engine is operating. It has been observed in accordance with the present invention that, in general, it is not particularly beneficial to inject fluid into the motor intake when the motor is operating at relatively low speeds or at substantially less than full load. Assuming that the engine is operating at or near full load, the fluid requirement of the engine is a minimum or negligible quantity at low speeds and increases rapidly as the speed of the engine increases. With certain types of engines, such as conventional automobile engines, a further complication arises in that the fluid requirement of the engine reaches a peak at a speed below the maximum speed of the engine following which, as the speed increases, the fluid requirement drops off sharply.

It is a principal object of the invention to provide a fluid injecting system for internal combustion engines which is fully automatic in operation and which is arranged to vary the amount of fluid injected into the motor intake in relationship to the requirements of the engine as the speed and load conditions vary.

It is a further object of the present invention to provide such a fluid injecting system which is of practical design and efficient in operation so that it may be utilized with conventional internal combustion engines and is adapted to be used with any desired type of fluid such as water or alcohol, or water-alcohol mixtures.

Another object of the invention is to provide a fluid injecting arrangement which is of simple design and which eliminates unnecessary and/or expensive equipment. In connection with this object, it is an aim to provide an arrangement in which no auxiliary pumping apparatus or vaporizers are required.

A further object of the invention is to provide a fluid injecting device which is simple and easy to fabricate and assemble and disassemble and which can be applied universally to all standard internal combustion engines with a minimum of installation difficulties and which may be assembled and disassembled easily and conveniently for repair and/or replacement.

Other objects will be in part obvious and in part pointed out more in detail hereinafter.

The invention accordingly consists in the features of construction, combination of elements and arrangements of parts which will be exemplified in the construction hereafter set forth and the scope of the application of which will be indicated in the appended claims.

Figure 2:
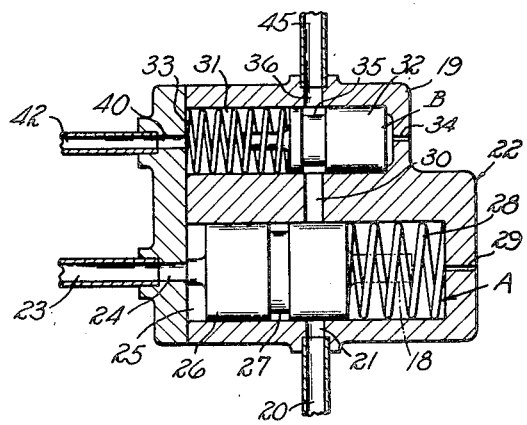

In the drawing:

Figure 1 is a diagrammatic view of an embodiment of the invention as connected to a standard internal combustion engine of the type conventionally utilized in automobiles, the view of the engine being only fragmentary and likewise diagrammatic; and Fig. 2 is an enlarged cross sectional view of a composite valve mechanism utilized in the preferred embodiment of the invention.

Referring to the drawing, there is shown a fluid reservoir or tank 10 into which is adapted to be introduced a fluid suitable for injection into an engine intake to obtain the improved operating characteristics referred to, such as water or alcohol, or water-alcohol mixture, through the filler opening 9. The tank 10 is substantially airtight and is adapted to be placed under pressure when the filler opening cap 11 is in place. The tank 10 may be made of any suitable size, but, in general, it is preferred to make the capacity of tank 10 approximately one-tenth of that of the fuel tank (not shown) of the engine, this being a conveniently small size yet providing a sufficient reservoir of fluid so as to require relatively infrequent replenishment. If desired, however, a smaller or larger tank requiring more frequent or fewer replenishments of fluid may be utilized.

The tank 10 is connected at its upper end to the exhaust manifold 12 of the internal combustion engine 13 by means of a conduit 14, by reason of which connection the fluid reservoir 10 is placed under a pressure substantially equal to that of the exhaust back pressure of the engine. The amount of pressure on the tank 10 is limited, however, by means of a pressure release valve 17 disposed in the conduit 15 which is designed to open when the pressure in tank 10 reaches a predetermined maximum level.

A conduit 20 connects the bottom of the fluid reservoir or tank 10 with an inlet passageway 21 of a composite valve generally denoted by the reference numeral 22. The composite valve 22 is, in reality, a plurality of independent valves A and B which, in the interests of compactness and convenience of installation, are contained, in the preferred embodiment, in a single housing or body 19. As will be obvious to one skilled in the art, it is a mere matter of choice whether the valve portions A and B are formed as a single piece of apparatus or as separate elements, nor is the order in which these valves are utilized critical.

As shown more particularly in Fig. 2, the valve A of composite valve 22 is formed with a bore 25 in which is slidably received a piston 26 having a peripheral groove 27 situated intermediate the ends of the piston. The piston 26 is spring-loaded by means of a compression spring 28. A small orifice 29 is provided at the right-hand extremity of the bore 25 to eliminate any compression when the piston 26 moves to the right as viewed in the drawing. The opposite end of the bore 25 communicates with a passageway 24 to which is connected a pressure conduit 23 extending between the passageway 24 and the exhaust manifold 12.

The piston 26 normally, i. e., when the engine is shut off and no pressure is in the conduit 23, will be situated in the position shown in the drawing by reason of the action of spring 28. However, as the exhaust pressure of the engine is built up, this pressure is exerted through conduit 23 upon the left-hand face of the piston 26, as viewed in the drawing, causing the piston to be moved to the right. When the piston 26 is moved to the right a sufficient amount to align the groove 27 with the inlet passageway 21 and the diametrically opposite passageway 30, a path is provided for the flow of fluid from the fluid reservoir 10 under the influence of the pressure on the fluid reservoir or tank 10 through passageway 21 and groove 27 to the interior passageway 30. When the exhaust pressure further increases, the piston 26 is moved to the right sufficiently to move the groove 27 beyond the passageways 21 and 30 thereby causing the left-hand portion of the piston 26 to block the communication between passageway 21 and the passageway 30.

The passageway 30 communicates with the bore 31 of valve B in which is slidably mounted a piston 32 which is spring-loaded by means of spring 33 so as to normally move to the right as viewed in the drawing. An orifice 34 is provided at the end of the bore 31 so that the right-hand face of the piston 32 is always subjected to atmospheric pressure. The piston 32 is provided with an annular groove 35 which provides a path for fluid to flow between the passageway 30 and the outlet passageway 36 when the groove 35 is aligned therewith, i. e., when the piston 32 is in the normal position shown in the drawing. A passageway 40 extending into the left-hand end of the bore 31 is connected to the intake manifold 41 of the engine 13 by means of conduit 42. As a result of this connection, when the pressure in the intake manifold 41 drops below a predetermined value, the atmospheric pressure operating on the right-hand end of the piston 32 will cause the piston to move to the left as viewed in the drawing, whereupon the piston 32 closes the fluid path between the passageways 30 and 36. When the pressure in the intake manifold 41 rises above the predetermined value, of course, the spring 33 returns the piston 32 to the position shown in the drawing.

The outlet passageway 36 is connected by means of a conduit 45 to the carburetor 46, the conduit 45 being terminated in a jet orifice 47 on the inlet side of the venturi (not shown) of the carburetor so that any fluid injected through the conduit 45 will be vaporized or finely dispersed in the carburetor. By injecting the fluid in this manner, it is unnecessary to employ a separate vaporizing device for the injected fluid, although, if desired, such an auxiliary device may be utilized, the desideratum being that the fluid shall reach the motor intake in highly dispersed form. For simplicity of presentation, the jet orifice 47 has been shown as an orifice of fixed size, but it will be apparent to one skilled in the art that a variable orifice, such as of the needle valve type, may be substituted for greater flexibility and ease of adjustment.

With an injecting device arranged as set forth above, it has been found that the injection of fluid such as water or alcohol, or water-alcohol mixtures, into the intake of an engine may be accomplished automatically in amounts which closely approximate the requirements of a conventional automobile engine for optimum performance. The fluid requirements for obtaining optimum performance characteristics of any given engine may be readily determined by experimentation as, for example, by the method disclosed in an article entitled "Alcohol-water injection" by Colwell, Cummings and Anderson appearing in volume 53, No. 6 of Society of Automotive Engineers Journal (transactions), pp. 358-372. In accordance with such method, for example, the amount of fluid injected into an engine is manually adjusted at different engine speeds until the maximum power output at each of such speeds is obtained, whereupon fluid requirement may be plotted against speed. The amount of fluid required by the average internal combustion engine of the type conventionally used in automobiles generally follows the same pattern, i. e., the amount required is negligible at low speeds and rises rapidly to a peak at less than full speeds and drops off rapidly thereafter. For example, a 1941 Plymouth engine was found to require about 20 c. c. of fluid per minute at 800 R. P. M. which rose to a maximum of about 45 c. c. at 2200 R. P. M. and then dropped rapidly to zero at about 3200 R. P. M., all of these figures being obtained while the engine was operated at full load. With other types of engines, such as those utilized in aircraft, the fluid requirements are substantially in the same relationship except that the drop-off at less than full speed is less pronounced or entirely absent so that maximum or near maximum fluid injection is required through full speed.

In accordance with the invention, it has been observed that, when an internal combustion engine is operated at or near full load, the variation in exhaust back pressure of the engine in relationship to its speed throughout most of the speed range is related to the variation in fluid requirements of the same engine through the same speed range. For example, with a 1941 Plymouth engine, the exhaust back pressure varies from slightly less than 1 lb. per square inch at 800 R. P. M. in substantially straight line relationship to a pressure of about 2½ lbs. per square inch at 2200 R. P. M. At higher speeds, however, the pressure continued to increase instead of dropping off as did the fluid requirements of the engine.

In accordance with the invention, therefore, the fluid reservoir or tank 10 is placed under a pressure which is substantially the same as the engine exhaust pressure throughout the speed range during which the fluid requirements of the engine rises from a minimum to a maximum, and the pressure release valve 17 is designed to open at substantially the exhaust back pressure of the engine at the speed of the engine when the fluid requirements are a maximum. Referring again to the specific example of the 1941 Plymouth engine, the pressure release valve 17 is constructed and arranged to limit the pressure on the fluid reservoir or tank 10 to the exhaust back pressure of the engine at about 2200 R. P. M.

Knowing the exhaust back pressure and fluid requirements of a given engine, it is a simple matter to design or adjust the size of the jet orifice so that the fluid flow will closely parallel the requirements curve with reasonable accuracy. In general, the following formula will apply:

$$M = dAc\sqrt{2gh}$$

where:

$M$ = weight of fluid flowing (lbs. per sec.)
$d$ = density of fluid (lbs. per ft.$^3$)
$A$ = area of orifice (sq. feet)
$c$ = orifice constant
$g$ = gravitational acceleration
$h$ = pressure (feet of water)

Inasmuch as the fluid requirements of a conventional automobile engine are negligible at low and high speeds, the valve A in the specific embodiment shown is constructed and arranged to permit the flow of fluid from the reservoir 10 to the jet orifice only during the intermediate speed range. In other words, the spring 28 is designed to move the piston 26 to the position shown in Fig. 2 at engine speeds below about 800 R. P. M. and will be compressed sufficiently to open the passageway between passageways 21 and 30 at exhaust back pressures corresponding to the speed range of about 800 R. P. M. to about 3200 R. P. M. and at speeds above 3200 R. P. M. the exhaust back pressure is then sufficient to move piston 26 a sufficient distance to the right to shut off the flow of fluid between passageways 21 and 30. Inasmuch as the valve A is closed except when fluid is required by the engine while the same is operating, there will be no leakage from the reservoir 10 through the valve A and, therefore, if desired, the reservoir 10 may be placed above or below or at the same level as the composite valve, whichever may be convenient in the particular installation. When the device is to be utilized with aircraft engines, for example, in which there is no requirement for high speed shut-off, it will be apparent that the valve A may be modified, as for example by providing a projection 18 on the piston 26, as shown in dot and dash lines in the drawing, which will prevent the piston 26 from moving to the right beyond the position at which groove 27 is aligned with passageways 21 and 30. With the valve A so modified, there is no longer any need for differential pressures between valve A and the fluid reservoir 10 and, therefore, if desired, conduit 23 may be connected to conduit 20 instead of directly to the exhaust manifold 12 as shown in the drawing.

Inasmuch as the fluid requirements of the engine are negligible when the engine is operated at substantially less than full load, the valve B is provided to effectively close off the flow of fluid whenever the engine is operated at materially less than full load. As a specific example, the spring 33 may be designed so that the manifold suction at normal engine loads will hold the piston 32 in the "off" position, but when the manifold suction falls below approximately 6 inches of mercury (70 percent to 80 percent engine load) the piston 32 shifts to the "on" position as shown in the drawing.

It thus will be seen that a fluid injecting device constructed and arranged in accordance with the present invention will automatically inject fluid into the intake of the engine in very close proximation to the requirements of that engine under all conditions of operation. By reason of the valve B, the injecting of fluid will take place only when the engine is operating at or near full load. By reason of valve A, there will be no flow of fluid below a predetermined minimum speed of the engine or in the preferred embodiment for use with automotive engines above a predetermined maximum speed at which limits the requirements of the engine are negligible. Intermediate these minimum and maximum speed values, the amount of flow of fluid is proportional to the square root of the engine exhaust back pressure, as explained above, and the exhaust pressure varies in relationship to the change in fluid requirements of the engine as the speed of the engine increases. When the fluid requirements of the engine reach a maximum, the pressure release valve 17 prevents any further increase of pressure on the fluid reservoir 10 so that no further increase in the flow of liquid occurs. Although at higher speeds than that at which the maximum fluid requirement of the engine occurs there is, in the case of automotive engines, a rapid drop in the fluid requirement, the pressure on the fluid reservoir tank 10 will not decrease and, therefore, during this relatively small speed range there may be an excess of fluid injected into the engine intake. However, this excess has no deleterious effect upon the operation of the engine and the fluid loss is negligible. If desired, the valve A could be constructed and arranged to shut off the flow of fluid at this point, but it is believed to be preferable to permit the continued flow of fluid even though in excessive amount during this relatively small speed range because of the great improvement in engine operating characteristics over this speed range as compared with the negligible quantity of fluid wasted.

It thus will be seen that there has been provided, in accordance with the invention, a simple and easily fabricated device which is highly efficient and fully automatic in operation for the purposes intended and may be readily installed in any internal combustion engine to improve the operating characteristics thereof as set forth above. The device is foolproof in operation, may be readily assembled or disassembled, and will not be likely to be subjected to breakage or malfunctioning over long periods of hard usage.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention.

1. In an engine having a combustion chamber provided with intake air and exhaust gas passages, means having a water flow metering jet orifice located in the intake air passage for introducing water into said combustion chamber, means for supplying water to the jet orifice at a pressure substantially equal to the pressure in said exhaust gas passage whereby said jet orifice is subjected to a water metering pressure differential which is substantially equal to the pressure difference between said exhaust and intake passages, and means including a valve responsive to the pressure in said exhaust passage for admitting the flow of water to the jet orifice when said pressure exceeds a predetermined amount.

2. Apparatus according to claim 1, in which said valve is responsive to variations in the pressure in said exhaust passage relative to the ambient air pressure.

3. A fluid injecting device for internal combustion engines comprising a reservoir of fluid, means for introducing fluid from said reservoir into the engine intake, and valve means responsive to engine exhaust pressure for shutting off the flow of said fluid from the reservoir to the engine intake when the exhaust pressure falls below a predetermined minimum and when the exhaust pressure exceeds a predetermined maximum.

4. A fluid injecting device for internal combustion engines comprising a reservoir of fluid, means for introducing fluid from said reservoir into the engine intake, a pressure responsive valve constructed and arranged to shut off the flow of fluid from the reservoir to the engine intake when subjected to a pressure less than that of the exhaust back pressure of the engine when operated at a relatively low speed at full load, and means for subjecting the valve to the exhaust back pressure of the engine.

5. A fluid injecting device for internal combustion engines comprising a reservoir of fluid, means for introducing fluid from said reservoir into the engine intake, a valve for controlling the flow of said fluid from the engine to the engine intake in response to the exhaust back pressure of the engine having a first position when subjected to low pressures at which said flow is shut off, a second position when subjected to intermediate pressures at which said flow is turned on, and a third position when subjected to high pressures at which said flow is shut off, and means connecting the valve to the exhaust manifold of the engine.

6. A fluid injecting device for internal combustion engines comprising a reservoir of fluid, conduit means for introducing fluid from said reservoir into the engine intake, a valve for said conduit means comprising a cylinder having an inlet and outlet passageway, a piston slidable in said cylinder having a passageway adapted to be aligned with said inlet and outlet passageways to permit the flow of fluid therebetween, means biasing said piston into a first position with the piston passageway out of alignment with said inlet and outlet passageways to shut off the flow of fluid therebetween, and conduit means extending between the exhaust manifold of the engine and the valve for subjecting the piston to exhaust pressures, said valve being constructed and arranged so that the exhaust pressure of the engine will move the piston to a second position wherein said passageways are aligned at intermediate speeds at full load, and to a third position with the piston passageway out of alignment with said inlet and outlet passageways at high speeds at full load.

7. A fluid injecting device for an internal combustion engine comprising a reservoir of fluid, conduit means extending between the reservoir and the exhaust manifold of the engine whereby the reservoir is placed under exhaust pressure, a pressure release valve for limiting the amount of pressure on the reservoir, and means forming a passageway for the fluid from the reservoir to the intake of the engine.

8. A fluid injecting device for an internal combustion engine comprising a reservoir of fluid, conduit means extending between the reservoir and the exhaust manifold of the engine whereby the reservoir is placed under exhaust pressure, means forming a passageway for the fluid from the reservoir to the intake of the engine, and a pressure release valve constructed and arranged to limit the pressure on the reservoir to an amount equal to the exhaust pressure of the engine when operated at full load at a predetermined speed less than maximum speed.

9. A fluid injecting device for an internal combustion engine comprising a reservoir of fluid, means for placing said reservoir under pressure, means forming a passageway for the fluid from the reservoir to the intake of the engine, and valve means responsive to engine exhaust pressure for shutting off the flow of said fluid from the reservoir to the engine intake when the exhaust pressure falls below a predetermined minimum and when the exhaust pressure exceeds a predetermined maximum.

10. A fluid injecting device for an internal combustion engine comprising a reservoir of fluid, conduit means extending between the reservoir and the exhaust manifold of the engine for placing the reservoir under exhaust pressure, means forming a passageway for the fluid from the reservoir to the intake of the engine, and valve means responsive to engine exhaust pressure for shutting off the flow of said fluid from the reservoir to the engine intake when the exhaust pressure falls below a predetermined minimum.

11. A fluid injecting device for an internal combustion engine comprising a reservoir of fluid, conduit means extending between the reservoir and the exhaust manifold of the engine for placing the reservoir under exhaust pressure, a pressure release valve constructed and arranged to limit the pressure on the reservoir to an amount equal to the exhaust pressure of the engine at a predetermined speed less than maximum, means forming a passageway for the fluid from the reservoir to the intake of the engine, and valve means responsive to engine exhaust pressure for shutting off the flow of said fluid from the reservoir to the engine intake when the exhaust pressure falls below a predetermined minimum.

12. A fluid injecting device for an internal combustion engine comprising a reservoir of fluid, means forming a passageway for the fluid from the reservoir to the intake of the engine, a pressure responsive valve constructed and arranged to shut off the flow of said fluid from the reservoir to the engine intake when subjected to a pressure less than that of the exhaust back pressure when operated at a relatively low speed at full load and when subjected to a pressure greater than that of the exhaust back pressure when operated at a relatively high speed at full load, and conduit means for subjecting the valve and the reservoir to engine exhaust pressure.

13. A fluid injecting device for an internal combustion engine comprising a reservoir of fluid, means forming a passageway for the fluid from the reservoir to the intake of the engine, a pressure responsive valve constructed and arranged to shut off the flow of said fluid from the reservoir to the engine intake when subjected to a pressure less than that of the exhaust back pressure when operated at a relatively low speed at full load and when subjected to a pressure greater than that of the exhaust back pressure when operated at a relatively high speed at full load, conduit means for subjecting the valve and the reservoir to engine exhaust pressure, and a pressure release valve constructed and arranged to limit the pressure on the reservoir to an amount equal to the exhaust pressure of the engine at a predetermined speed less than maximum.

14. A fluid injecting device for an internal combustion engine comprising a reservoir of fluid, means for introducing fluid from said reservoir into the engine intake, means responsive to engine exhaust pressure for controlling the flow of fluid from the reservoir to the engine intake, a valve biased into open position constructed and arranged to shut off said flow of fluid when the valve is subjected to engine intake suction at substantially less than full load, and means connecting the valve to the intake manifold of the engine.

15. A fluid injecting device for an internal combustion engine comprising a reservoir of fluid, means for introducing fluid from said reservoir into the engine intake, conduit means extending between the reservoir and the exhaust manifold of the engine for placing the reservoir under exhaust pressure, a pressure release valve constructed and arranged to limit the pressure on the reservoir to an amount equal to the exhaust pressure of the engine when operated at full load at a predetermined speed less than maximum speed, and a pressure responsive valve for shutting off the flow of said fluid when the engine intake pressure is substantially less than when the engine is operated at full load.

16. A fluid injecting device for internal combustion engines having intake and exhaust manifolds comprising a reservoir of fluid, conduit means connecting said reservoir to the exhaust manifold of the engine whereby the reservoir is placed under a pressure substantially equal to the exhaust back pressure of the engine, conduit means for releasing fluid from said reservoir into the engine intake, a pressure responsive valve constructed and arranged to shut off the flow of said fluid at low pressures corresponding to exhaust pressures at low engine speeds, conduit means for subjecting the valve to substantially engine exhaust pressures, a second pressure responsive valve constructed and arranged to shut off the the flow of said fluid when subjected to a vacuum corresponding to that of the engine intake when the engine is operated at substantially less than full load, and conduit means connecting said second valve to the intake manifold.

17. A fluid injecting device for internal combustion engines having intake and exhaust manifolds comprising a reservoir of fluid, conduit means connecting said reservoir to the exhaust manifold of the engine whereby the reservoir is placed under a pressure substantially equal to the exhaust back pressure of the engine, conduit means for releasing fluid from said reservoir into the engine intake, a pressure responsive valve constructed and arranged to shut off the flow of said fluid at low and high pressures corresponding to exhaust pressures at low and high engine speeds, respectively, conduit means connecting said valve to the exhaust manifold of the engine whereby the valve is subjected to engine exhaust pressures, a second pressure responsive valve constructed and arranged to shut off the flow of said fluid when subjected to a vacuum corresponding to that of the engine intake when the engine is operated at substantially less than full load, and conduit means connecting said second valve to the intake manifold.

18. A fluid injecting device for an internal combustion engine having an intake and an exhaust manifold comprising a reservoir of fluid, a conduit extending between the reservoir and the exhaust manifold, a pressure release valve constructed and arranged to limit the pressure on the reservoir to substantially the exhaust pressure of the engine when operated at a speed at which the fluid requirement of the engine is a maximum, conduit means for releasing fluid from the reservoir to the engine intake having an orifice for limiting the flow to substantially an amount required by the engine at the exhaust pressures to which the reservoir is subjected, a valve operated by engine exhaust pressure constructed and arranged to shut off the flow of fluid when the fluid requirements of the engine are below a predetermined minimum, and a second valve operated by intake manifold suction constructed and arranged to shut off the flow of fluid when the engine is operated at substantially less than full load.

19. A fluid injecting device for internal combustion engines having an intake and an exhaust manifold, comprising a fluid reservoir tank, a conduit extending between the tank and the exhaust manifold for placing the tank under pressure substantially the same as the engine exhaust back pressure, a pressure release valve for limiting the amount of pressure on the reservoir tank, conduit means for conducting fluid from the reservoir tank to the intake of the motor, a first valve for controlling the flow of fluid through said conduit means comprising a pressure actuated member biased to a first position for shutting off the flow of fluid, and movable under pressure to an intermediate position for turning on the flow and at a higher pressure to a third position for shutting off the flow of fluid through said conduit means, a second valve for controlling the flow of fluid through said conduit means comprising a member biased to a first position for turning on the flow and movable by atmospheric pressure when subjected to a vacuum to a second position for turning off the flow of fluid through said conduit means, a conduit for connecting the first valve to the exhaust manifold of the engine, and a conduit for connecting the second valve to the intake manifold of the engine.

CHESTER HODGKINS.

REFERENCES CITED

The following references are of record in the file of this patent:

UNITED STATES PATENTS

| Number | Name | Date |
|---|---|---|
| 1,119,042 | Ricketts | Dec. 1, 1914 |
| 1,529,351 | Grooms | Mar. 10, 1925 |
| 1,530,464 | Leedom | Mar. 17, 1925 |
| 1,604,702 | Lupher | Oct. 26, 1926 |
| 1,803,097 | Critchlow | Apr. 28, 1931 |
| 1,889,584 | Zimmerer | Nov. 29, 1932 |
| 2,445,479 | Francis | July 20, 1948 |